(12) United States Patent
Konno et al.

(10) Patent No.: US 6,374,106 B2
(45) Date of Patent: *Apr. 16, 2002

(54) RADIO COMMUNICATION SYSTEM SEARCHING METHOD

(75) Inventors: Masahiro Konno; Tetsuya Hanawa, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,265

(22) Filed: Jun. 6, 1997

Related U.S. Application Data

(63) Continuation of application No. 08/578,784, filed on Dec. 26, 1995, now abandoned, which is a continuation of application No. 08/098,817, filed on Jul. 29, 1993, now abandoned.

(30) Foreign Application Priority Data

Dec. 22, 1992 (JP) .............................................. 4-341770

(51) Int. Cl.[7] ................................................ H04Q 7/20
(52) U.S. Cl. ........................ 455/432; 455/434; 455/552
(58) Field of Search ................................ 455/422, 426, 455/432, 435, 436, 434, 524, 525, 550, 552

(56) References Cited

U.S. PATENT DOCUMENTS

| | | | | |
|---|---|---|---|---|
| 4,903,320 A | * | 2/1990 | Hanawa ...................... | 455/33.1 |
| 4,905,301 A | * | 2/1990 | Krolopp et al. ............ | 455/34.1 |
| 4,916,728 A | * | 4/1990 | Blair ........................... | 455/33.1 |
| 5,020,091 A | * | 5/1991 | Krolopp et al. .............. | 379/59 |
| 5,101,500 A | * | 3/1992 | Marvi ........................ | 455/33.1 |
| 5,159,625 A | * | 10/1992 | Zicker ......................... | 455/432 |
| 5,313,653 A | * | 5/1994 | Sasuta .......................... | 455/509 |
| 5,428,666 A | * | 6/1995 | Fyfe et al. ................... | 455/551 |
| 5,442,806 A | * | 8/1995 | Barber et al. ................. | 379/59 |

FOREIGN PATENT DOCUMENTS

EP 0 352 786 1/1990

OTHER PUBLICATIONS

Motorola DYNA TAC 6000XL Cellular Mobile Telephone User's Manual, 1987.
Motorola MINI TAC 6800XL Cellular Mobile Telephone User's Manual, 1987.

* cited by examiner

Primary Examiner—Nguyen T. Vo
(74) Attorney, Agent, or Firm—Staas & Halsey, LLP

(57) ABSTRACT

A radio communication system searching method for a portable telephone terminal for selecting, when a plurality of radio communication systems having different carrier frequencies are present in a same area, a suitable one of the radio communication systems. The searching method is improved in that radio communication systems can be searched in order beginning with a radio communication system which is the most advantageous to the user to eliminate the problems of a disorder of company types of radio communication systems and system selection involved in adjacent systems of a same company type. After preferential order numbers of a plurality of radio communication systems are registered into the portable telephone terminal, a home radio communication system of a predetermined frequency with which the portable telephone terminal is under contract is first searched, and then, when the home radio communication system has not been searched out successfully, the remaining radio communication systems are successively searched in accordance with the preferential order numbers registered in advance in the portable telephone terminal.

9 Claims, 7 Drawing Sheets

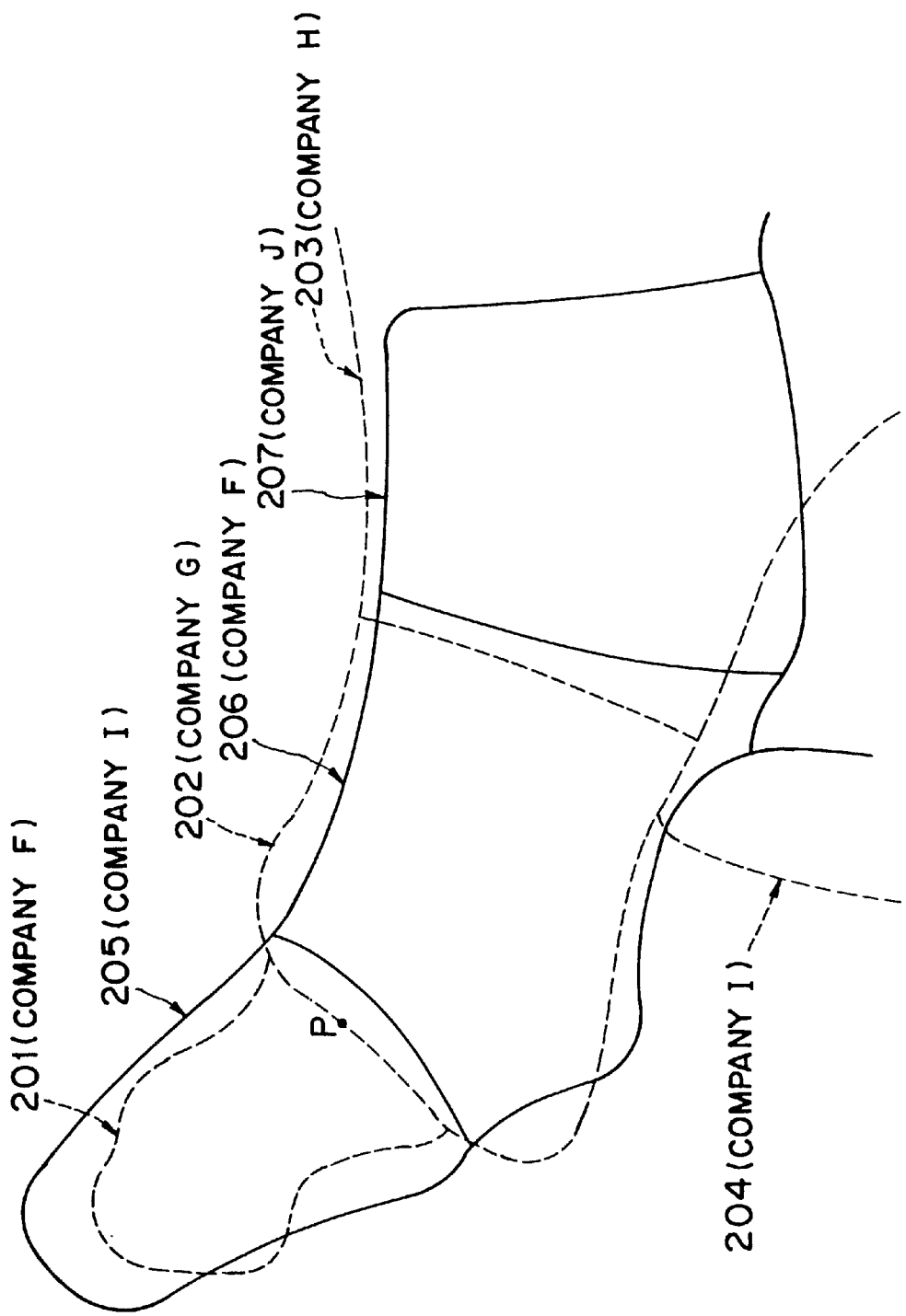

RADIO COMMUNICATION SYSTEM SEARCHING METHOD

This application is a continuation of application Ser. No. 08/578,784, filed Dec. 26, 1995, now abandoned, which is a continuation of application Ser. No. 08/098,817, filed Jul. 29, 1993, now abandoned.

BACKGROUND OF THE INVENTION

This invention relates to a radio communication system searching method for a portable telephone terminal for selecting, when a plurality of radio communication systems having different carrier frequencies are present in a same area, a suitable one of the radio communication systems.

In radio communication systems for portable telephone terminals (including mobile telephone terminals) of the AMPS (Advanced Mobile Phone System) system adopted in North America, Australia and so forth, normally two different types of radio communication systems having different carrier frequencies are used in a same area so that various services by the two systems are available in the area. The two types of radio communication systems are generally classified from each other and managed depending upon whether the enterprise which makes the body of management is a radio company or a main line company. In the following description, a radio communication system managed by a radio company will be hereinafter referred to as a radio company system, and a radio communication system managed by a main line company will be hereinafter referred to as a main line company system.

The two types of systems will be described in detail below with reference to FIG. 6. In FIG. 6, a radio company system is arranged in each of areas defined by broken lines while a main line company system is arranged in each of areas defined by solid lines. In particular, a radio company system managed by a company A is arranged in an area 101; a main line company system managed by another company B is arranged in another area 102 which is a substantially same area as the area 101; another radio company system managed by the company A is arranged in a further area 103 which is different and spaced away from the area 101; another main line company system managed by a further company C is arranged in a still further area 104 which is a substantially same area as the area 103; a further radio company system managed by a still further company D is arranged in a yet further area 105 which is different and spaced away from the areas 101 and 103; and a further main line company system managed by a yet further company E is arranged in a yet further area 106 which is a substantially same area as the area 105.

When the systems are managed in such a manner as shown in FIG. 6, if a particular user of a portable telephone terminal executes a contract with the radio company system managed by the company A in the area 101, then the radio company system arranged in the area 101 makes a home system to the portable telephone terminal user. While the main line company system arranged in the substantially same area 102 and managed by the company B is present in the area 101 since the main line company system of the company B is a system outside of the contract to the user who is under contract with the radio company system of the company A, naturally the charge for usage of the main line company system is rather high.

By the way, when the user which is under contract with the radio company system of the company A in the area 101 moves from within the area 101 to any one of the other areas 103 to 106, any one of these systems is outside the contract to the user. However, it is supposed that, as seen from FIG. 6, there may possibly be the same company as the particular company which manages the radio company system with which the user is under contract such as, for example, the company A which manages the radio company system in the area 103, or an affiliated company of the particular company such as, for example, the company D which manages the radio company system in the area 105.

While the system which is managed by such company is not the home system to the user, the user can use the system at a rather lower charge than the charge in ordinary roaming (to access a system other than the system with which the user is under contract, that is, a main line company system when the user is under contract with a radio company system, or a radio company system when the user is under contract with a main line company system). Also the charge system for users under contract with a main line company system is substantially similar to that for the user of the radio company system described above.

Accordingly, where the management areas of the systems are constructed as seen in FIG. 6, a portable telephone terminal of a user under contract with a radio company system is only required to have a function of preferentially searching a radio company system or of searching only a radio company system while a telephone terminal of another user under contract with a main line company system is only required to have a function of preferentially searching a main line company system or of searching only a main line company system.

In short, since the management area configuration of the systems is systematic as seen from FIG. 6, a portable telephone terminal is only required to preferentially search a radio communication system as with which the user is under contract or of searching only such radio communication system can be set by operation of the user itself (for example, by operation of keys). More specifically, if setting for preferentially searching a radio communication system with which the user is under contract is performed once, then a system favorable to the user can always be selected without modifying the setting once more.

In recent years, however, as the demand for portable telephones increases, the utilization areas of radio communication systems expand and also the number of radio communication systems continues to increase. Also excessive competition among radio communication systems is increasing.

Also, due to an influence of such expansion and increase of and excessive competition among radio communication systems, the classification of radio communication systems between a radio company system and a main line company system is disordered, and such a form (refer to FIG. 7 which will be hereinafter described) that a same enterprise manages, in an area, a radio communication system of the same carrier frequency as that of the radio company system described above, but manages, in another area, another radio communication system of the same carrier frequency as that of the main line company system described above occurs. The function of searching a radio communication system provided for conventional telephone terminals cannot cope with the situation.

Therefore, it is desired that, while a user itself understands the arrangement of radio communication systems, it can make use of a function of selecting a portable telephone terminal to set and modify criteria for a search in accordance with a position wherein the portable telephone terminal is used.

Further, if radio communication systems of the same company type are employed in adjacent areas, then three or more radio communication systems may be present as a result of overlapping of such systems in a region in which only two radio communication systems have been present till then.

In such a situation just described, since a portable telephone terminal of the AMPS specification preferentially searches and accesses a radio communication system which is highest in intensity in radio waves (electric field), depending upon the condition of the radio waves, the user may not possibly access a radio communication system best to the user (in short, a radio communication system which is the most advantageous to the user in terms of the charge for using). In the worst case, even if the user is in the area under contract (at home), it cannot access even the home system.

For example, the situation wherein radio communication systems of the same company type are present in adjacent areas and a same enterprise manages radio communication systems of different company types and the situation wherein a user cannot access its home system while it is in an area of the home system will be described in more detail with reference to FIG. 7. It is to be noted that, also in FIG. 7, any region defined by a broken line is an area in which a radio company system is incorporated, and any region defined by a solid line is an area in which a main line company system is incorporated.

Referring to FIG. 7, a radio company system managed by a company F is arranged in an area 201; another radio company system managed by another company G is arranged in another area 202 adjacent to the area 201; a further radio company system managed by a further company H is arranged in a further area 203 adjacent to the area 202; a still further radio company system managed by a still further company I is arranged in a still further area 204 adjacent to the areas 202 and 203; a main line company system managed by the company I is arranged in a yet further area 205 which is substantially the same as the area 201; another main line company system managed by the company F is arranged in a yet further area 206 which is substantially the same as the area 202: and a further main line company system managed by a yet further company J is arranged in a yet further area 207 which almost overlaps with the area 203.

It is assumed that, where the systems are managed as seen in FIG. 7, a user of a portable telephone terminal who is, for example, under contract with the radio company system managed by the company F in the region 201 accesses at a position P substantially on the boundary between the areas 201 and 202 shown in FIG. 7. In this instance, at the position P, not only the radio company system managed by the company F but also the radio company system managed by the company G (area 202) and the main line company system managed by the company I (area 205) are present in an overlapping relationship. Here, it naturally is the best choice, in short, the most advantageous in terms of the charge for using, to the user whose home system is the radio communication system of the area 201 to search and access the radio communication system of the area 201 which is the home system of the user.

However, since a portable telephone terminal of the AMPS specification preferentially searches and accesses that radio communication system which is highest in intensity of radio waves as described above, even if the radio communication system of the company type with which the user is under contract (in this instance, the radio company system) is preferentially searched, radio waves of the radio company system managed by the company G in the area 202 may possibly be more intense, depending upon the condition of radio waves, than radio waves of the radio company system managed by the company F in the area 201 which is the home system of the user. Thus, while the user is in the area 201 in which the home system of it is arranged, it may search and access the radio company system managed by the company G which is not the home system of the user.

Recently, also, a radio communication system with which, even when this is a roam system (a radio communication system of a different company type from that (carrier frequency) of the radio communication system with which the user is under contract), a service is available at a low charge similar to that of the home system has been provided as a result of the intensification of the competition for acquisition of users, and repletion of a radio communication system searching function on the portable telephone terminal side is demanded earnestly.

SUMMARY OF THE INVENTION

It is an object of the present invention to provide a radio communication system searching method by which radio communication systems can be searched in order beginning with a radio communication system which is the most advantageous to the user, to eliminate the problems of disorder of company types of radio communication systems and system selection involved in adjacent systems of a same company type and enhance economy.

It is another object of the present invention to provide a radio communication system searching method wherein the time required to search a radio communication system advantageous to a portable telephone terminal is minimized.

It is a further object of the present invention to provide a radio communication system searching method wherein preferential order numbers for optimum selection can be set arbitrarily to a portable telephone terminal in accordance with a demand of the user or an area in which the portable telephone terminal is used so that the portable telephone terminal can cope readily with such a case wherein the user of the portable telephone terminal moves over a wide range.

In order to attain the objects described above, according to an aspect of the present invention, there is provided a radio communication system searching method for a portable telephone terminal for selecting, when a plurality of radio communication systems having different carrier frequencies are present in an overlapping relationship in a same area, one of the radio communication systems, the portable telephone terminal including searching means for searching the radio communication systems and preferential order registration means for registering preferential order numbers of the radio communication systems in advance into the portable telephone terminal, the searching method comprising the steps of searching, by the searching means, a home radio communication system of a predetermined carrier frequency with which the portable telephone terminal is under contract, and successively searching, when the home radio communication system has not been searched out, by the searching means, the remaining radio communication systems in accordance with the preferential order numbers registered in advance in the portable telephone terminal by the preferential order registration means.

At the step of successively searching the radio communication systems in accordance with the preferential order numbers by the searching means, the one of the radio communication systems which has a different carrier frequency from the predetermined carrier frequency of the home radio communication system may be searched preferentially. Or, when the successive searching of the radio communication systems in accordance with the preferential order numbers by the searching means fails to search out a relevant radio communication system, the one of the radio communication systems which has the same carrier frequency as the predetermined carrier frequency of the home radio communication system may be searched preferentially by the searching means.

The preferential order numbers may be determined in accordance with the charge for using of circuits which is advantageous to the portable telephone terminal.

The preferential order registration means may be provided on a body of the portable telephone terminal. In this instance, an operation of registering each of the preferential order numbers by the preferential order registration means is performed by operating keys provided on the portable telephone terminal to input an ID number and a preferential order number of a radio communication system to be registered. Further, the preferential order registration means may include storage means for storing an ID number of a radio communication system inputted by such registering operation in accordance with a preferential order number inputted subsequently to the ID number.

According to another aspect of the present invention, there is provided a radio communication system searching method for a portable telephone terminal for selecting, when a plurality of radio communication systems having different carrier frequencies are present in an overlapping relationship and some of the radio communication systems having a same carrier frequency are managed in adjacent areas by different management system companies, one of the radio communication systems, the portable telephone terminal including searching means for searching the radio communication systems and preferential order registration means for registering preferential order numbers of the radio communication systems in advance into the portable telephone terminal, the searching method comprising the steps of searching, by the searching means, a home radio communication system of a predetermined carrier frequency in a predetermined area with which the portable telephone terminal is under contract, and successively searching, when the home radio communication system has not been searched out, by the searching means, the remaining radio communication systems in accordance with the preferential order numbers registered in advance in the portable telephone terminal by the preferential order registration means.

At the step of successively searching the radio communication systems in accordance with the preferential order numbers by the searching means, the one of the radio communication systems which has a different carrier frequency from the predetermined carrier frequency of the home radio communication system may be searched preferentially. Or, when the successive searching of the radio communication systems in accordance with the preferential order numbers by the searching means fails to search out a relevant radio communication system, the one of the radio communication systems which has the same carrier frequency as the predetermined carrier frequency of the home radio communication system may be searched preferentially by the searching means.

The preferential order numbers may be determined in accordance with the charge for using of circuits which is advantageous to the portable telephone terminal.

The preferential order registration means may be provided on a body of the portable telephone terminal. In this instance, an operation of registering each of the preferential order numbers by the preferential order registration means is performed by operating keys provided on the portable telephone terminal to input an ID number and a preferential order number of a radio communication system to be registered. Further, the preferential order registration means may include storage means for storing an ID number of a radio communication system inputted by such registering operation in accordance with a preferential order number inputted subsequently to the ID number.

With the radio communication system searching method, after the preferential order numbers of the radio communication systems are registered in advance into the portable telephone terminal, the home radio communication system to the portable telephone terminal is searched first, and then, when the home radio communication system has not been searched out successfully the remaining radio communication systems are successively searched in accordance with the preferential order numbers registered in advance in the portable telephone terminal. Consequently, the radio communication system searching method is advantageous in that the radio communication systems can be searched successively in order beginning with the one of the radio communication systems which is the most advantageous to the user of the portable telephone terminal. The problems of a disorder of company types of the radio communication systems and system selection involved in an adjacent arrangement of systems of a same company type can be eliminated, and besides, the searching system is very superior in economy.

Further, where, at the step of successively searching the radio communication systems in accordance with the preferential order numbers, that the one of the radio communication systems which has a different carrier frequency from the predetermined carrier frequency of the home radio communication system is searched preferentially, there is an advantage in that the time required to search out a radio communication system advantageous to the portable telephone terminal is reduced remarkably. Similarly, when the successive searching of the radio communication systems in accordance with the preferential order numbers fails to search out a relevant radio communication system, where that the one of the radio communication systems which has the same carrier frequency as the predetermined carrier frequency of the home radio communication system is searched preferentially, similarly the time required to search out a radio communication system advantageous to the portable telephone terminal can be reduced remarkably.

Further, where the preferential order numbers are determined in accordance with the charge for using circuits which are advantageous to the portable telephone terminal, the radio communication systems are successively searched beginning with the one of them which is advantageous in terms of the charge, and accordingly, the economical advantage is very high.

Furthermore, since the keys provided on the portable telephone terminal can be operated to input an ID number and a preferential order number of a radio communication system to be registered and the ID number of the radio communication system can be stored into the storage means of the preferential order registration means provided on the body of the portable telephone terminal in accordance with the preferential order number of it inputted subsequently to the ID number, optimum preferential order numbers can be registered arbitrarily into the portable telephone terminal in accordance with a requirement of the user and/or an area in which the portable telephone terminal is used. Consequently, the radio communication system searching method can cope readily with a case wherein the user of the portable telephone terminal moves over a wide range.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 7 is a similar view but showing another example of arrangement of management areas of radio communication systems.

DESCRIPTION OF THE PREFERRED EMBODIMENT

Figure 1:
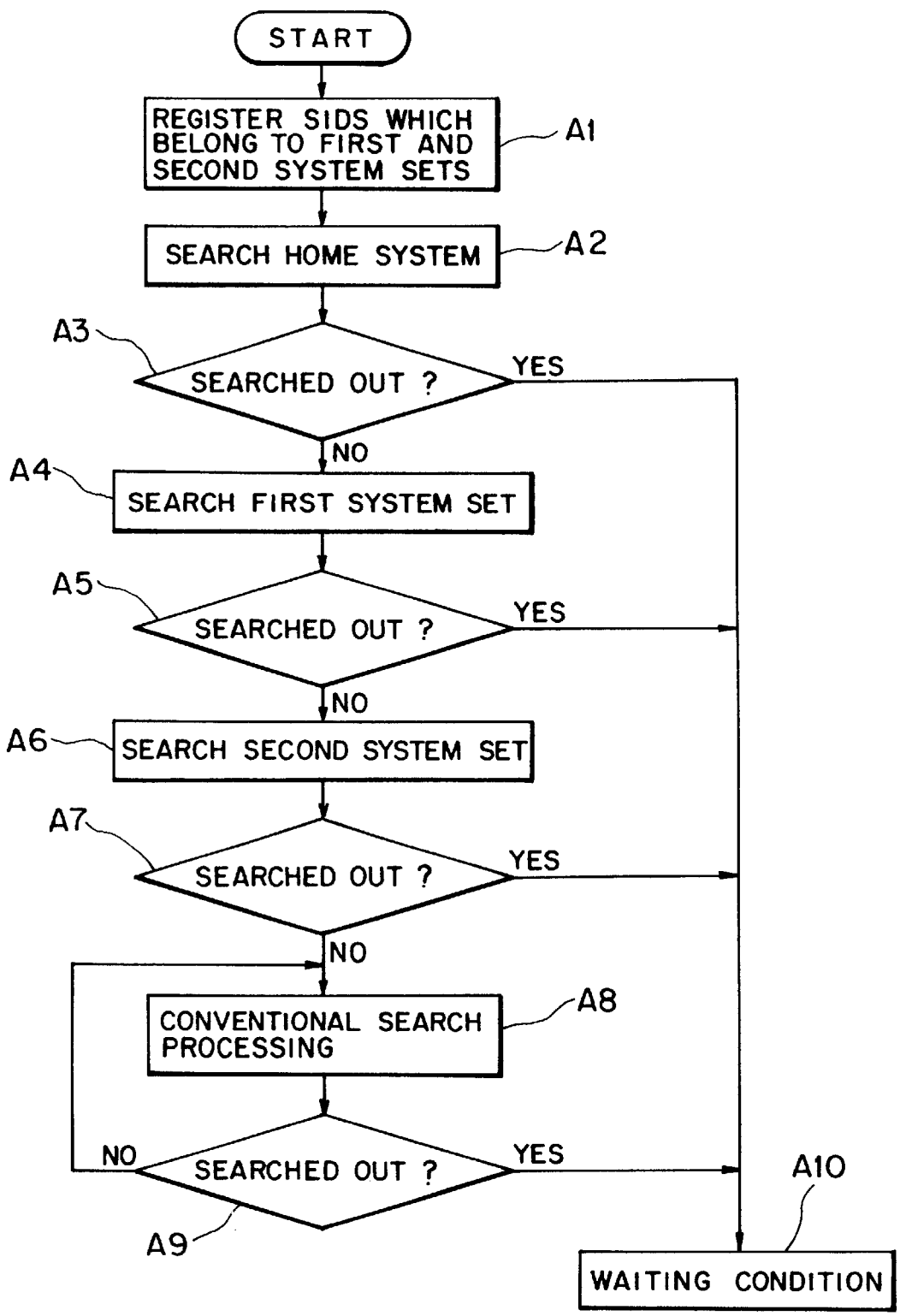
FIG. 1 is a flow chart illustrating different steps of operations of a radio communication system searching method according to the present invention.

While a preferred embodiment of the present invention is described below, the radio communication system searching method of the present embodiment is applied to a case wherein, when radio communication systems of two different company types (a radio company system and a main line company system) having different carrier frequencies are present in an overlapping relationship and some of the radio communication systems (the radio company system and the main line company system) having a same carrier frequency are managed in adjacent areas by different management type companies and besides some of the radio communication systems of different company types are managed by a same enterprise similarly as in the arrangement of management areas of radio communication systems shown in FIG. 7, one of the radio communication systems is selected by a portable telephone terminal.

Before the radio communication system searching method of the present embodiment is described in detail, names of various systems in the present embodiment, criteria for determination of a preferential order in the present embodiment and a system of charges for using (charges for using of circuits) will be described below.

The present embodiment involves radio communication systems of two company types including a radio company system and a main line company system having different carrier frequencies as described above, and the type (predetermined carrier frequency) of a system with which a portable telephone terminal is under contract will be hereinafter referred to as home type while the type of any other system than the system with which the portable telephone terminal is under contract will be hereinafter referred to as roam type. In short, to a portable telephone terminal under contract with a radio company system, the radio company system is a home type system while a main line company system is a roam type system. It is assumed here that, in the present embodiment, a radio company system is the home type system of the portable telephone.

Further, while a portable telephone terminal normally has a contract with regard to an area (for example, the area 201 in FIG. 7) together with a type (predetermined carrier frequency) of a radio communication system, the radio communication system of the home type in the contract area will be hereinafter referred to as home type/home or home system (home radio communication system), and a radio communication system of the roam type in the contract area will be hereinafter referred to as roam type/home. Further, a home type in any other area than the contract area will be hereinafter referred to as home type/roam, and a roam type in any other area than the contract area will be hereinafter referred to as roam type/roam.

Meanwhile, in the present embodiment, by registering radio communication systems into two groups of a first system group and a second system group which are classified in accordance with the criteria described below, the radio communication systems are determined to and classified into two preferential order numbers of the first system group which is high in preferential order and the second system group which is high in preferential order next to the first system group. In particular, the criterion for determination of registration into the first system group is that the radio communication system is not the home system but a system from which a communication service is available with the same charge for using of circuits as the home system due to, for example, cooperation between the management companies of the systems, and the criterion for determination of registration into the second system group is that the system is a system (in most cases, a roam type/roam system) from which a communication service is available at a second lowest charge for using of circuits next to the home system due to, for example, cooperation between the management companies of the systems similarly to the first system group.

As regards a system of charges (high or low in charge) for usage of circuits, where the system names mentioned above are used, conventionally the relationship of home system<home type/roam system<roam type/home system or roam type/roam system stands. However, where such preferential order numbers as described above, that is, the first system group and the second system group, are introduced, in the present embodiment, the relationship of home system<first system group<second system group or home type/roam system<roam type/home system or roam type/roam system stands. In the present embodiment, searching for a radio communication system is performed in accordance with the order hereinafter described so that the best system (system most advantageous to the user in terms of the charge for using of circuits) can be selected preferentially irrespective of operation of the user.

Subsequently, the construction of the portable telephone terminal used in the present embodiment will be described with reference to FIGS. 3 to 5.

Figure 3:
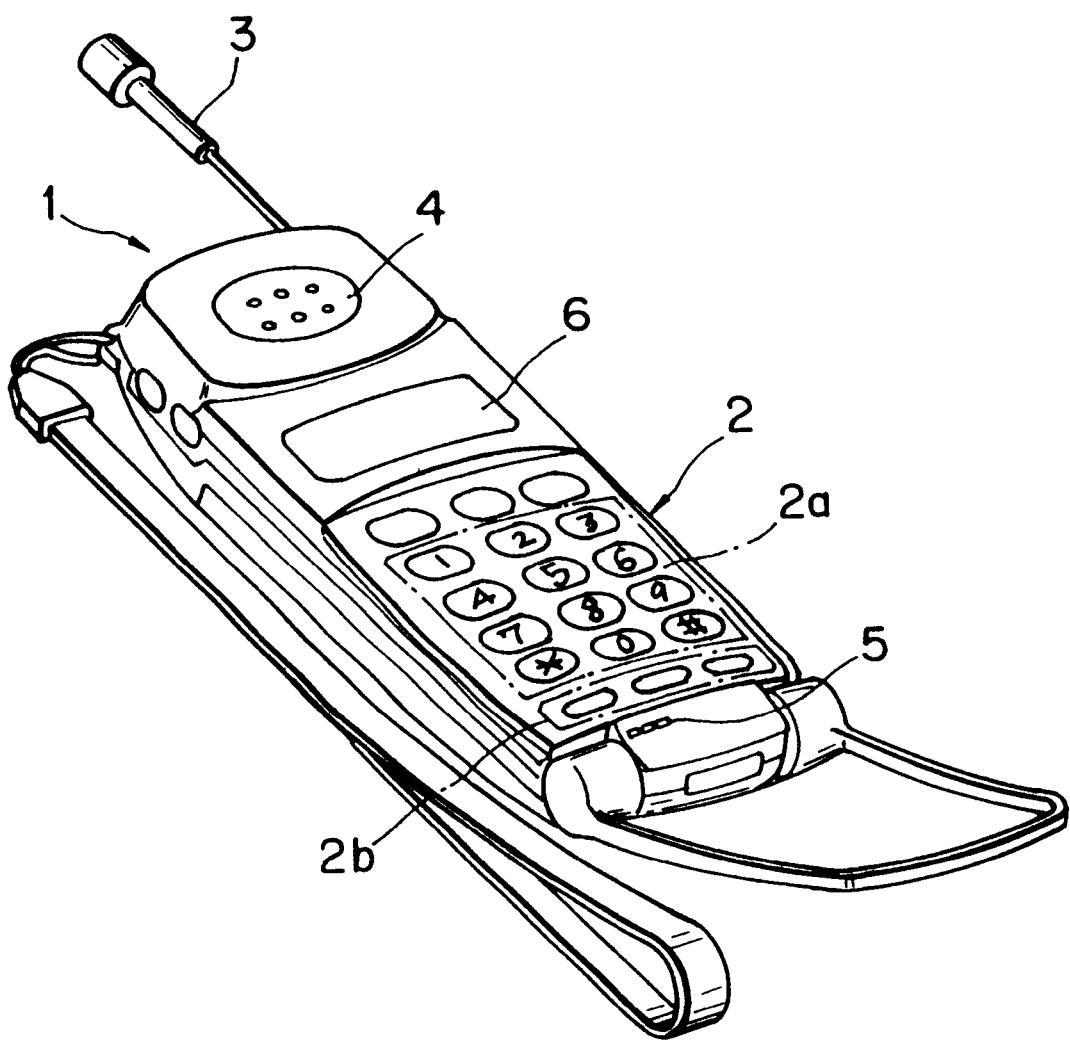
FIG. 3 is a perspective view showing an appearance of a portable telephone terminal to which the radio communication system searching method of the present invention is applied.

Referring first to FIG. 3, there is shown an appearance of the portable telephone terminal. The portable telephone terminal 1 has a keyboard section 2 on which a ten key set 2a including a "#" key and an "*" key for inputting various information and a function key set 2b including a mode change-over key and a store key for being operated for registration of a system ID which will be hereinafter described are provided. The portable telephone terminal 1 further has an antenna 3, a loudspeaker (receiver) 4, a microphone 5, and a display 6 for displaying information of operation of the keyboard section 2 and so forth thereon.

Figure 4:
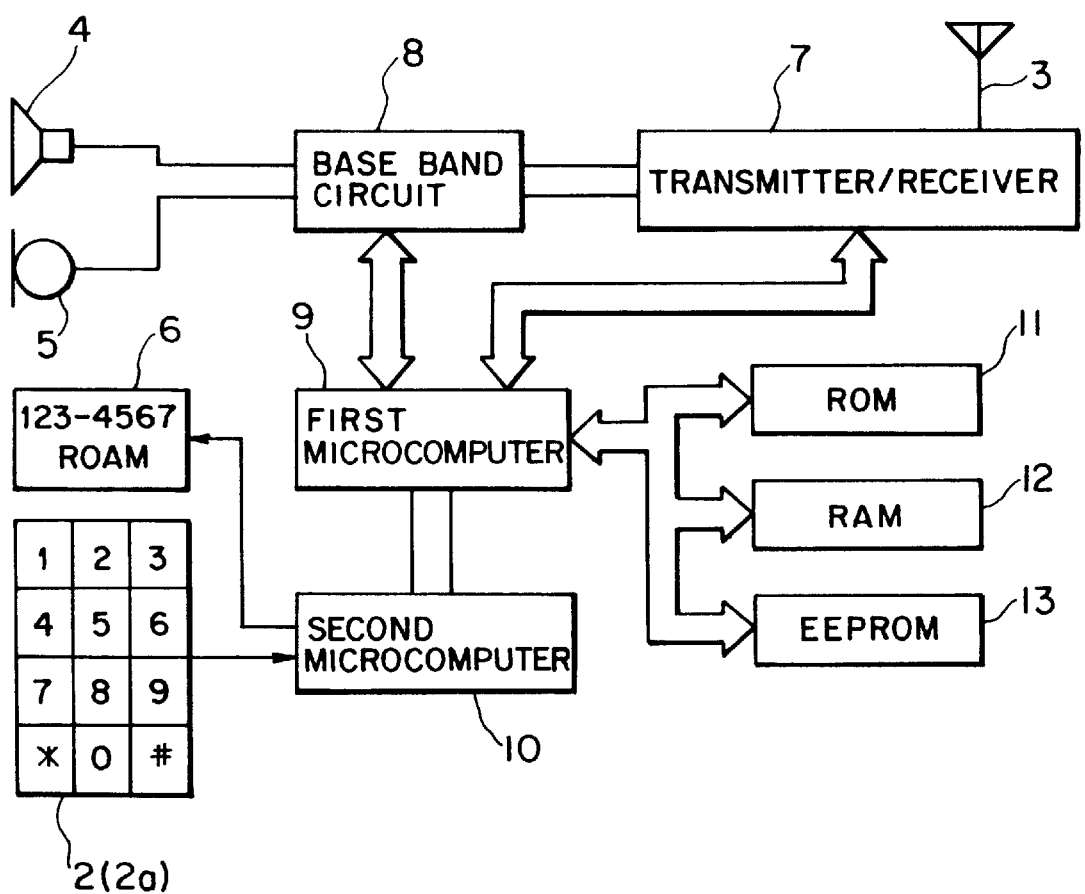
FIG. 4 is a block diagram showing a general construction of the portable telephone terminal shown in FIG. 3.

Referring now to FIG. 4, there is shown a general construction of the portable telephone terminal 1 shown in FIG. 3. The portable telephone terminal 1 includes a transmitter/receiver 7 connected to the antenna 3 for transmitting and receiving radio waves of a radio communication system. The transmitter/receiver 7 functions as means for searching a radio communication system in response to an instruction from a first microcomputer which will be hereinafter described. The portable telephone terminal 1 further includes a base band circuit 8 for demodulating and outputting a sound signal received by the transmitter/receiver 7 during a call to the loudspeaker 4 and for modulating a sound signal received from the microphone 5 to transmit the same from the transmitter/receiver 7.

The portable telephone terminal 1 further includes a first microcomputer 9 for controlling principal functions (communication sequences and various user functions) of the portable telephone terminal 1, and a second microcomputer 10 interposed between the first microcomputer 9 and the keyboard section 2 and display 6 for controlling man-machine interface functions (supervision of the keys and display control) of the portable telephone terminal 1.

The portable telephone terminal 1 further includes a ROM (read only memory) 11 in which various processing programs (including a processing program necessary to execute the searching method in the present embodiment) for the communication sequences, the user functions and so forth are stored in advance, a RAM (random access memory) 12 serving as a working area for operation of the first microcomputer 9, and an EEPROM (electrically erasable programmable read only memory) 13 serving as storage means in which dial numbers which are used comparatively frequently, a system ID number (which may be hereinafter referred to as SID) of the home system with which the portable telephone terminal 1 is under contract, SIDs of radio communication systems registered in the first system group and the second system group described hereinabove and so forth are stored in advance. It is to be noted that, in FIG. 4, the keyboard section 2 is shown only including the ten key set 2a while the function key set 2b is omitted.

Figure 5:
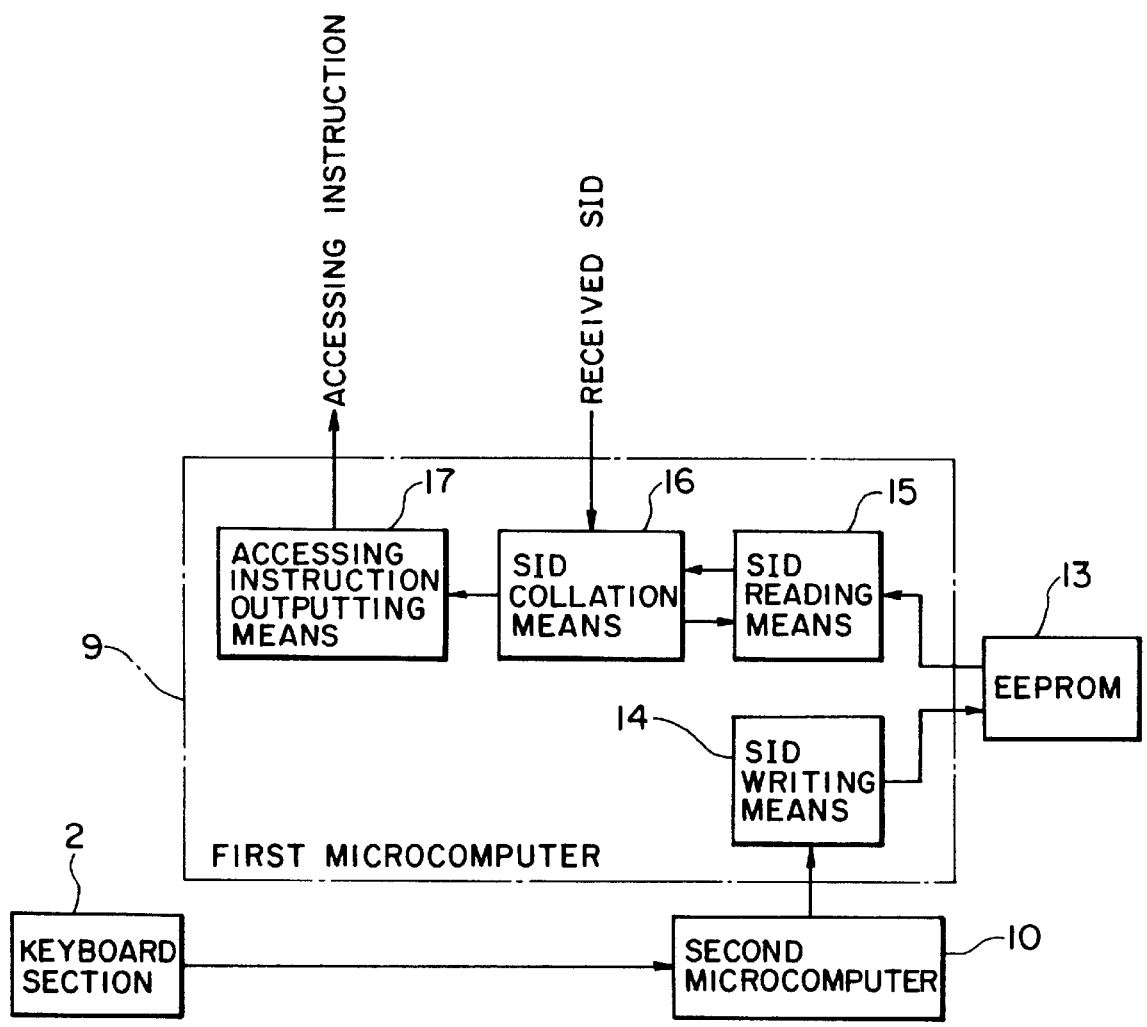
FIG. 5 is a block diagram functionally showing a construction for a searching function and a registering function of the portable telephone terminal shown in FIG. 3.

Referring now to FIG. 5, there is shown a construction for the searching function and the registering function of the portable telephone terminal 1 in the present embodiment. The portable telephone terminal 1 includes SID writing means 14 for writing a SID to be registered, which has been inputted by manually operating the ten key set 2a and the function key set 2b of the keyboard section 2 of the portable telephone terminal 1 in such a manner as hereinafter described, into the EEPROM 13 in accordance with a preferential order (to which one of the first and second system groups the portable telephone terminal 1 is to belong) which is inputted subsequently. The keyboard section 2, the second microcomputer 10, the SID writing means 14 and the EEPROM 13 constitute preferential order registration means for registering a preferential order number of a radio communication system into the portable telephone terminal 1.

The portable telephone terminal 1 further includes SID reading means 15 for reading out SIDs stored in the EEPROM 13 in order of the home system, the first system group and the second system group, and SID collation means 16 for collating a SID of a radio communication system received from the outside by way of the transmitter/receiver 7 with the SIDs read out by the SID reading means 15 to determine whether or not the relevant radio communication system has been searched out. The portable telephone terminal 1 further includes accessing instruction outputting means 17 for outputting, when it is determined by the collation means 16 that the relevant radio communication system has been searched out, an instruction to access the radio communication system.

The radio communication system searching method in the present embodiment which is performed using the portable telephone terminal 1 having such a construction as described above will be described with reference to FIGS. 1 and 2. A general flow of operations of the searching method of the present embodiment will first be described with reference to FIG. 1.

First, the user of the portable telephone terminal 1 in the present embodiment classifies the radio communication systems into the first system group and the second system group in terms of preferential order numbers in accordance with areas of use of the portable telephone terminal 1 or some other factors required by the user, and sets the SIDs of the predetermined radio communication systems to the system groups (step A1).

Here, a detailed registering operation will be described. First, the mode change-over key of the function key set 2b of the keyboard 2 of the portable telephone terminal 1 will be depressed to change over the displaying condition of the display 6 to a registration operation screen for SIDs, and then required keys of the ten key set 2a of the keyboard section 2 of the portable telephone terminal 1 will be successively depressed to enter a SID of 5 or 6 figures of the radio communication system to be registered while numerals thus inputted are displayed on the display 6.

Then, after the SID displayed on the display 6 is confirmed, it is registered as the first system group into the EEPROM 13 by way of the SID writing means 14, for example, by depressing the "#" key, or it is registered as the second system group into the EEPROM 13 by way of the SID writing means 14, for example, by depressing the "*" key.

Figure 6:
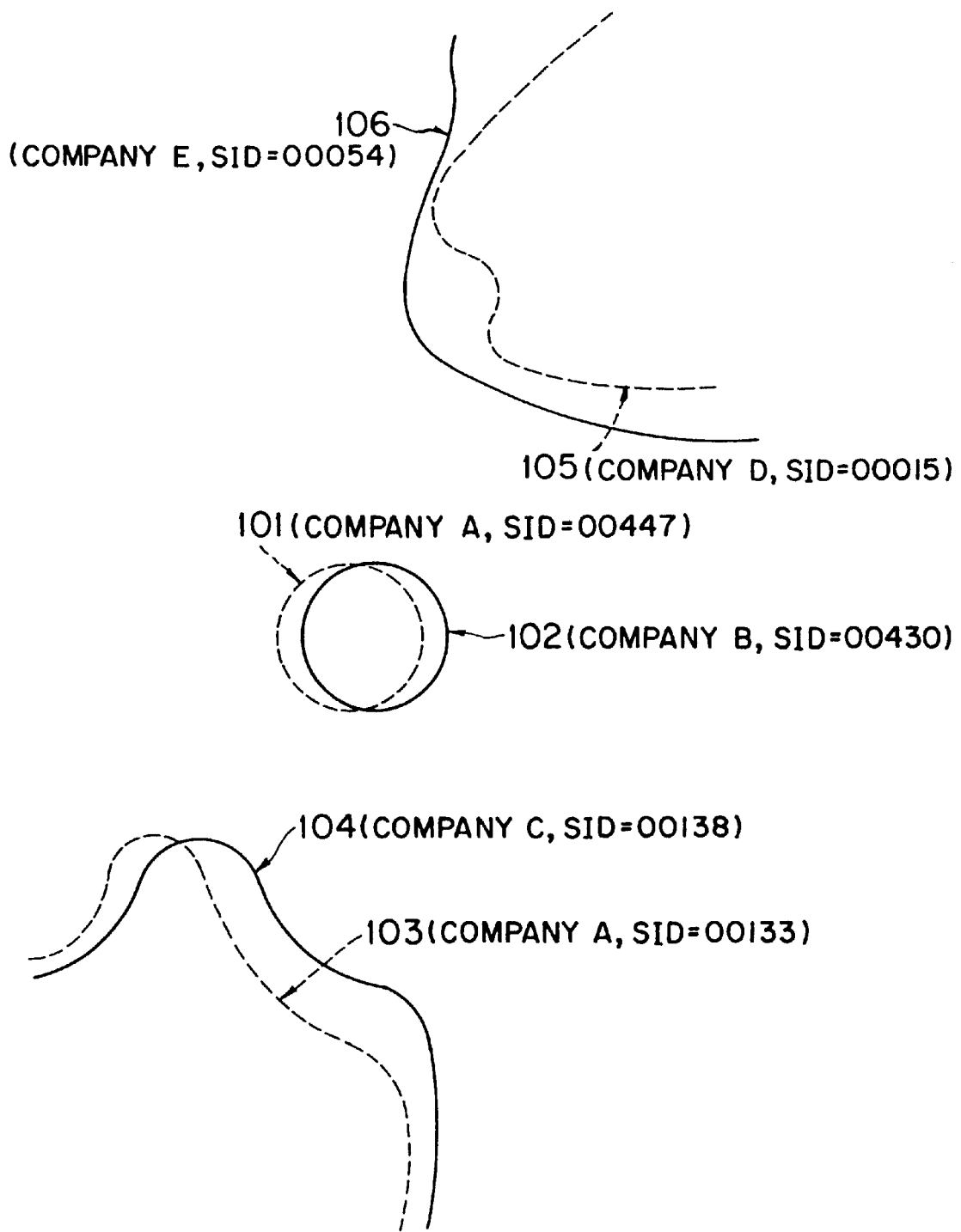
FIG. 6 is a diagram showing an example of arrangement of management areas of radio communication systems.

It is to be noted that such SID is determined in advance for each of the types (carrier frequencies) of radio communication systems and for each of areas (management companies) as shown in FIG. 6 and is printed and published on a roaming guide book or the like on the market. Thus, the user of the portable telephone terminal 1 will perform registration of a SID into a suitable system group referring to such a roaming guide book as described above each time the user moves to a new area or for each of all areas to which the user may possibly move sooner or later.

After desired SIDs are registered as desired preferential order numbers into the EEPROM 13 in accordance with the requirement of the user as described above, when the portable telephone terminal 1 is actually connected to the circuit and used, the home system to the portable telephone terminal 1 is first searched from among all of the available radio communication systems (step A2).

In particular, the SID of the home system is read out from the EEPROM 13 by the SID reading means 15, and the SIDs held by radio waves are decoded from all of radio waves which can be received by way of the transmitter/receiver 7. Then, the received SIDs and the SID of the home system from the EEPROM 13 are collated with each other by the SID collation means 16 to search out the home system to the portable telephone terminal 1. It is to be noted that, since generally every radio communication system successively transmits information including an ID (SID) of the radio communication system and also the portable telephone terminal 1 holds, in the EEPROM 13 or the like, a SID of the home system with which it is under contract, such searching for the home system as described above can be handled readily only by addition of the SID without departing from a conventional procedure.

When the result of the collation by the SID collation means 16 proves coincidence between the received SID and the SID of the home system and thus proves success in searching out of the home system (YES at step A3), an accessing instruction is outputted from the accessing instruction outputting means 17 and the portable telephone terminal 1 enters into and thereafter remains in a waiting condition until it accesses the home system (step A10).

On the contrary when the result of the collation by the SID collation means 16 proves the presence of no received SID which coincides with the SID of the home system and hence proves failure in searching out of the home system (NO at step A3), the first system group from which a communication service is available at the same charge for using of circuits as that of the home system is searched (step A4). Then, when the searching of the first system group results in failure (NO at step A5), the second system group is searched subsequently (step A6).

Also in searching at each of steps A4 and A6, similarly as upon searching for the home system, SIDs of radio communication systems which belong to the first system group or the second system group are read out from the EEPROM 13 by the SID reading means 15 while SIDs of radio waves received by way of the transmitter/receiver 7 are decoded, and the received SIDs and the SIDs from the EEPROM 13 are collated with each other by the SID collation means 16 to search out a radio communication system which belongs to the first system group or the second system group.

Then, when a radio communication system of the first system group has been searched out (YES at step A5) or when a radio communication system of the second system group has been searched out (YES at step A7), an accessing instruction is outputted from the accessing instruction outputting means 17 and the portable telephone terminal 1 enters into and thereafter remains in a waiting condition until it accesses the radio communication system which belongs to the first system group or the second system group (step A10).

On the contrary, when no radio communication system of any of the first system group and the second system group has been searched out (NO at steps A5 and A7), searching processing similar to that in the prior art is entered (step A8). In the searching processing. For example, because of the reason described in the description of the related art, a radio communication system of the home type to the portable telephone terminal 1 (here, a radio company system) is searched preferentially. Then, when a radio company system (or in some other case, a main line company system) has been searched out as a result of the searching processing at step A8 (when the judgment at step A9 is YES), an accessing instruction is outputted from the accessing instruction outputting means 17 and the portable telephone terminal 1 enters into and thereafter remains in a waiting condition until it accesses the radio communication system (step A10).

Subsequently, a searching processing operation in the present embodiment after desired SIDs have been registered with desired preferential order numbers in accordance with the requirements of the user will be described in more detail with reference to FIG. 2.

After the power supply to the portable telephone terminal 1 is turned on, first the home system to the portable telephone terminal 1 is searched from among all of radio communication systems which can be received then (searching processing C1 for the home system). In short, similar processing to that at steps A2 and A3 described above is performed to determine whether or not the home system has been searched out successfully (steps B1 and B2).

Figure 2:
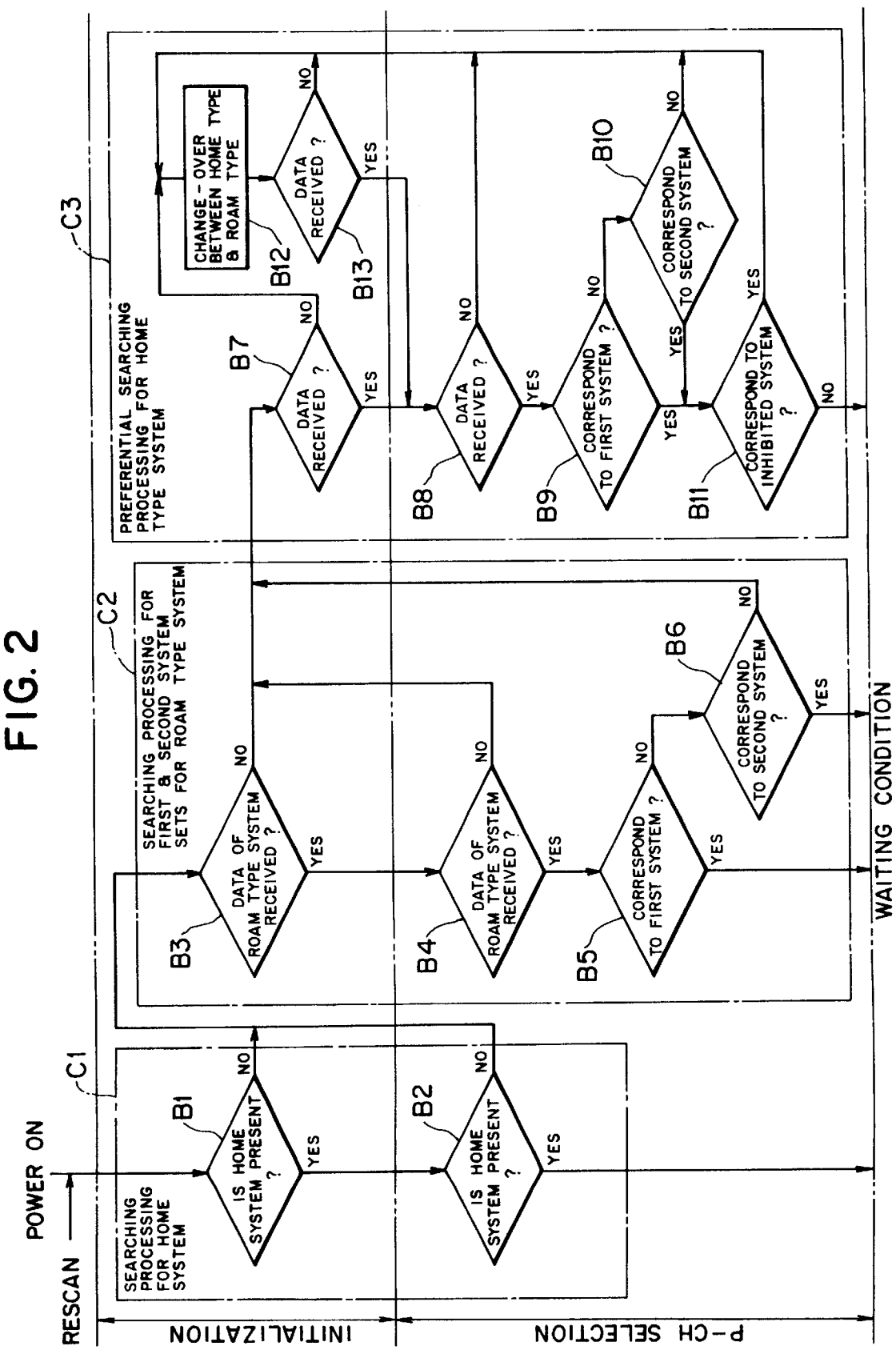
FIG. 2 is a flow chart illustrating the radio communication system searching method of the present invention in more detail.

Here, each searching processing C1 to C3 illustrated in FIG. 2 is divided into two layers of an initialization portion and a paging channel selection (P-CH selection) portion, and determination of the presence or absence of the home system and success or failure in reception of data are determined in each layer. This is because, where the portable telephone terminal 1 is a mobile telephone terminal, the position of the terminal 1 may possibly vary by a great amount in a short time, resulting in a great variation of the receiving condition from a radio communication system, and accordingly, the same determination is performed twice for the object of confirmation.

When it is determined at steps B1 and B2 that the home system is present, the portable telephone terminal 1 enters into a waiting condition. But, on the contrary, when it is determined at steps B1 and B2 that the home system has not been searched out, the searching processing C1 for the home system is ended, and then, the searching processing C2 for those of roam type systems (main line company systems in the present embodiment) which belong to the first system group and then to the second system group is performed.

In this instance, it is considered that the portable telephone terminal 1 is present in an area in which it cannot search the home system, that is in any other area than the area in which the home system is arranged. In such an instance, since a system of the roam type (a main line company system in the present embodiment), different from the home type, is in most cases more advantageous in terms of the charge from excessive competition among radio communication systems in recent years, in the present embodiment, the searching processing C2 is performed preferentially for a system of the roam type. Consequently, the time for which it is required to determine a radio communication system to wait, that is, the time for which the user cannot use the portable telephone terminal 1, can be minimized.

Then, in the searching processing C2, it is determined whether or not data have been received from a system of the roam type (steps B3 and B4), and then, when it is determined at both of steps B3 and B4 that data have been received, processing similar to that at steps A4 to A7 in FIG. 1 is performed to determine whether or not the received data correspond to the first system group from which a communication service is available at the same charge for using of circuits as that of the home system (step B5). Then, when the determination at step B5 is in the affirmative, the portable telephone terminal 1 enters into a waiting condition. However when the determination at step B5 is in the negative, it is determined subsequently whether or not the received data correspond to the second system group (step B6).

When the determination at step B6 proves that the received data correspond to the second system group, the portable telephone terminal 1 enters into a waiting condition, but when the received data do not correspond to the second system group or when it is determined at steps B3 and B4 that no data have been received from any system of the roam type, the searching processing C2 is ended, and then, a system of the home type is searched preferentially by the searching processing C3.

The searching processing C3 is basically similar to searching processing of the prior art and, from the reason described in the description of the related art, preferentially searches a radio communication system of the home type to the portable telephone terminal 1.

In the searching processing C3, it is determined first whether or not data have been received from a system of the home type (steps B7 and B8), and when it is determined at both of steps B7 and B8 that data have been received, it is subsequently determined by similar processing to that at steps A4 to A7 in FIG. 1 whether or not the received data correspond to the first system group from which a communication service is available at the same charge for using of circuits as that of the home system (step B9). Then, when the received data correspond to the first system group, but on the contrary, when the received data do not correspond to the first system group, it is further determined whether or not the received data correspond to the second system group (step B10). Then, when the received data correspond to the second system group.

At step B11, it is determined whether or not the received data correspond to any one of inhibited systems. Such an inhibited system is registered in advance in the EEPROM 13 or the like as a system which will not be used from the reason that the charge for using of circuits is extremely high or from some other reason. When it is finally determined at step B11 that the received data do not correspond to any one of the inhibited systems, the portable telephone terminal 1 enters into a waiting condition.

On the contrary, when it is determined at step B11 that the received data correspond to one of the inhibited systems, or when it is determined at step B7 or B8 that no data have been received the subject for searching processing is changed over from a radio communication system of the home type to a radio communication system of the roam type (step B12), and then it is determined whether or not data have been received from a radio communication system of the roam type (steps B13 and B8). Thereafter, the processing at steps B13 and B8 to B11 is repeated while changing over between the home type and the roam type is performed at step B12 until after a suitable radio communication system is searched out.

In this manner, according to the searching method of the present embodiment, the system searching function of the portable telephone terminal 1 required by the user and the system side is expanded sufficiently, and a SID can be registered arbitrarily in accordance with a preferential order number based on the requirement of the user for the portable telephone terminal 1. Accordingly, radio communication systems can be searched in order preferentially beginning with a radio communication system which is the most advantageous to the user, and the searching method of the present embodiment not only can eliminate a disorder of the company types of radio communication systems but also is superior in economy.

Further, as described above, since the searching system of the AMPS specification preferentially searches and accesses radio communication systems beginning with a radio communication system of the most intense radio waves, when a plurality of radio communication systems overlap in a same region due to adjacent arrangements of radio communication systems, if the radio waves of the home system are weak, then even if the portable telephone terminal 1 is present in the arrangement area of the home system, the situation that the home system cannot be accessed arises with the prior art. However, since the home system to the portable telephone terminal 1 is searched out from among all of radio communication systems which can be received then as at step A2 in FIG. 1 or the searching processing C1 in FIG. 2, such situation as described above can be eliminated, and the problem of selection of a system involved in an adjacent arrangement of systems of the same company type.

Further, when the portable telephone terminal 1 is present outside the arrangement area of the home system, since, in most cases, a radio communication system of the roam type is comparatively advantageous in terms of the charge due to an influence of excessive competition among different radio communication systems in recent years, there is an advantage in that the time required to search out a radio communication system which is advantageous in terms of the charge to the portable telephone terminal 1 can be reduced remarkably by preferentially searching a radio communication system of the roam type as seen from the searching processing C2 In FIG. 2.

It is to be noted that, while the embodiment is described applied to the case wherein two different kinds of radio communication systems of the radio company type and the main line company type, in short, two kinds of radio communication systems having different carrier frequencies, are present in an overlapping condition, the present invention is not limited to this.

Further, while the embodiment is described such that radio communication systems are classified into two types of the first system group and the second system group in terms of the preferential order and SIDs of predetermined radio communication systems are individually registered into the relevant system groups, the method of the present invention is not limited to this, and the preferential order can be divided into finer preferential order numbers.

Further, while in the embodiment described above, the method of the present invention is applied to such a situation that a plurality of radio communication systems having different carrier frequencies are present in an overlapping relationship and even radio communication systems of a same carrier frequency are managed in adjacent areas by different management company types as seen in FIG. 7 depending upon the areas, the method of the present invention is applied similarly as in the embodiment described above to another situation wherein a plurality of radio communication systems having different carrier frequencies are merely present in an overlapping relationship in a same area as seen in FIG. 6 (those radio communication systems of a same carrier frequency which are not managed in an adjacent relationship by different management company types). Also in this instance, similar advantages to those of the embodiment described above can be attained.

The present invention is not limited to the specifically described embodiment, and variations and modifications may be made without departing from the scope of the present invention.

What is claimed is:

1. A radio communication system searching method for a portable telephone terminal which selects, when a plurality of radio communication systems having different carrier frequencies are present in an overlapping relationship in a common geographical area, one of the radio communication systems, said searching method comprising:

searching the radio communication systems for a home radio communication system of a predetermined carrier frequency desired by a user;

searching, prior to the radio communication systems for a home type radio communication system having a common frequency to the home radio communication system, the radio communication systems for a roam type radio communication system having a different frequency from the home radio communication system according to a first predetermined system set, when the home radio communication system has not been searched out;

searching the radio communication systems for said home type radio communication system according to a second predetermined system set, when the roam type radio communication system has not been searched out;

checking the radio communication systems for an inhibited system when the home type radio communication system has not been searched out; and searching again the radio communication systems for the roam type radio communication system when the inhibited system has been searched out.

2. A radio communication system searching method for a portable telephone terminal which selects, when a plurality of radio communication system having different carrier frequencies are present in an overlapping relationship in a common geographical area, one of the radio communication systems, said searching method comprising the steps of:

(a) searching the radio communication systems for a home radio communication system of a predetermined carrier frequency desired by a user;

(b) searching, prior to the radio communication systems for a home type radio communication system having a common frequency to the home radio communication system, the radio communication systems for a roam type radio communication system having a different frequency from the home radio communication system according to a first predetermined system set, when the home radio communication system has not been searched out;

(c) searching the radio communication systems for said home type radio communication system according to a second predetermined system set, when the roam type radio communication system has not been searched out; and (d) switching between searching the radio communications systems for the roam type radio communication system and the home type radio communication system, each time a previous one of the home and roam type radio communications systems and an inhibited system have not been searched out.

3. A radio communication search method comprising:

registering into a portable telephone terminal a plurality of preferred radio communication systems, the preferred radio communication systems having an advantageous charge structure;

searching for presence of a home system;

if the home system is not present, searching for presence of one of the registered preferred radio communication systems; and if one of the preferred radio communication systems is not present, searching for presence of remaining systems, wherein said searching for presence of one of the preferred radio communications systems first searches the preferred radio communication system which have a different carrier frequency from a frequency of the home system first, then searches for presence of one of the preferred radio communication systems which have a same frequency of the home system.

4. The radio communication search method recited in claim 3, further comprising determining preferential order numbers so that a higher degree of priority is given to a particular radio communication system which requires a lower charge for use.

5. A radio communication search method comprising:

registering into a portable telephone terminal a plurality of preferred radio communication systems, the preferred radio communication systems having an advantageous charge structure;

searching for presence of a home system;

if the home system is not present, searching for presence of one of the registered preferred radio communication systems; and if one of the preferred radio communication systems is not present, searching for presence of remaining systems, wherein said searching for presence of remaining systems first searches for a remaining system using a same frequency of the home system.

6. A portable telephone comprising:

a registering device registering a plurality of preferential order numbers of radio communication systems, the preferential order numbers having an advantageous charge structure; and a searching device searching for radio communication systems, wherein the searching device searches for presence of a home radio communication system of a predetermined carrier frequency, if the home radio communication system of a predetermined carrier frequency is not present, then the searching device searches for presence of one of the registered preferential order numbers, if one of the registered preferential order numbers is not present, then the searching device searches for presence of remaining communication systems, wherein said searching for presence of remaining systems first searches for a remaining system using a same frequency of the home system.

7. The portable telephone recited in claim 6, wherein:

the registering device registers a first group of preferential numbers having a same charge as the home radio communication system, and a second group of preferential numbers having a higher charge than that of the home communication system, and when the searching device searches for presence of preferential order numbers, the searching device searches the first group first and the second group second.

8. A radio communication search method comprising:

registering into a portable telephone terminal a plurality of preferred radio communication systems;

searching for presence of a home system;

if the home system is not present, searching for presence of one of the preferred radio communication systems; and if one of the preferred radio communication systems is not present, searching for presence of remaining systems, wherein said searching for presence of one of the preferred radio communications systems first searches the preferred radio communication system which have a different carrier frequency from a frequency of the home system first, then searches for presence of one of the preferred radio communication systems which have a same frequency of the home system.

9. A radio communication search method comprising:

registering into a portable telephone terminal a plurality of preferred radio communication systems;

searching for presence of a home system;

if the home system is not present, searching for presence of one of the preferred radio communication systems; and if one of the preferred radio communication systems is not present, searching for presence of remaining systems, wherein said searching for presence of remaining systems first searches for a remaining system using a same frequency of the home system.

* * * * *